United States Patent
Ferdinand

(10) Patent No.: US 9,667,598 B2
(45) Date of Patent: May 30, 2017

(54) PRIVACY PROTECTED INTERNET NETWORKS, SUBNETWORKS AND SUB-SUBNETWORKS

(71) Applicant: Richard Ferdinand, Old Tappan, NJ (US)

(72) Inventor: Richard Ferdinand, Old Tappan, NJ (US)

(*) Notice: Subject to any disclaimer, the term of this patent is extended or adjusted under 35 U.S.C. 154(b) by 0 days.

(21) Appl. No.: 14/991,298

(22) Filed: Jan. 8, 2016

(65) Prior Publication Data
US 2016/0127324 A1    May 5, 2016

Related U.S. Application Data

(63) Continuation of application No. 14/148,810, filed on Jan. 7, 2014, now abandoned.

(51) Int. Cl.
H04L 29/06    (2006.01)

(52) U.S. Cl.
CPC ........ *H04L 63/0421* (2013.01); *H04L 63/083* (2013.01)

(58) Field of Classification Search
None
See application file for complete search history.

(56) References Cited

U.S. PATENT DOCUMENTS

| | | | |
|---|---|---|---|
| 5,442,708 A | 8/1995 | Adams et al. | |
| 9,094,390 B1 * | 7/2015 | Rao | G06Q 30/08 |
| 2001/0044785 A1 * | 11/2001 | Stolfo | G06F 21/6254 |
| | | | 705/74 |
| 2002/0019764 A1 * | 2/2002 | Mascarenhas | G06Q 30/02 |
| | | | 707/792 |
| 2002/0083163 A1 * | 6/2002 | Collazo | H04L 41/022 |
| | | | 709/223 |
| 2002/0095514 A1 * | 7/2002 | Cromer | H04L 29/12 |
| | | | 709/245 |
| 2003/0041263 A1 | 2/2003 | Devine et al. | |
| 2003/0163413 A1 * | 8/2003 | Wiczkowski | G06Q 20/00 |
| | | | 705/38 |
| 2005/0050352 A1 | 3/2005 | Narayanaswami et al. | |

(Continued)

*Primary Examiner* — Malcolm Cribbs
(74) *Attorney, Agent, or Firm* — Keith D. Nowak; Danielle C. Sullivan; Carter Ledyard & Milburn LLP

(57) ABSTRACT

A computerized methods and systems to create, control and manage restricted scope and closed internet interactive networks, subnetworks and sub-subnetworks. The invention permits the protected network, subnetworks and sub-subnetworks to be connected to an open or previously established network, yet still remaining protected, secure and anonymous. Entrance into the protected interactive networks, subnetworks and sub-subnetworks by the user is achieved through a protected network device, anonymous address code, anonymous access code and/or anonymous login information. As the user interacts with the digital elements within the protected interactive networks, subnetworks and sub-subnetworks, a database of said interactions is created and used by the protected network provider in various ways, such as for user behavior information. No personal identifiable information is stored within interactive networks, subnetworks and/or sub-subnetworks and communication on said networks is unique, which inhibits and deters the targeting of the networks by cyber-criminals.

18 Claims, 5 Drawing Sheets

(56) References Cited

U.S. PATENT DOCUMENTS

| | | | |
|---|---|---|---|
| 2006/0165100 A1* | 7/2006 | Huang | H04W 64/00 370/400 |
| 2006/0284744 A1* | 12/2006 | Shotland | G06F 17/3089 341/50 |
| 2007/0143853 A1* | 6/2007 | Tsukamoto | G06F 21/35 726/26 |
| 2008/0005359 A1 | 1/2008 | Khosravi et al. | |
| 2009/0126002 A1 | 5/2009 | Vail et al. | |
| 2010/0070758 A1 | 3/2010 | Low et al. | |
| 2010/0217825 A1* | 8/2010 | Gopalakrishna | H04L 67/02 709/217 |
| 2013/0104243 A1* | 4/2013 | Benedetti | H04L 63/0421 726/26 |
| 2013/0262573 A1* | 10/2013 | McMaster | G06Q 50/01 709/204 |
| 2013/0262850 A1* | 10/2013 | Canpolat | H04W 12/08 713/150 |
| 2014/0006777 A1* | 1/2014 | Amiri | H04L 63/0823 713/158 |
| 2014/0310779 A1* | 10/2014 | Lof | H04L 63/0421 726/4 |
| 2015/0067055 A1* | 3/2015 | Khera | H04L 63/0407 709/204 |
| 2015/0095428 A1* | 4/2015 | Isidore | H04L 67/22 709/204 |
| 2015/0095501 A1* | 4/2015 | Candelore | H04L 61/2092 709/227 |
| 2016/0142380 A1* | 5/2016 | Fuller | G06F 21/6254 726/9 |

* cited by examiner

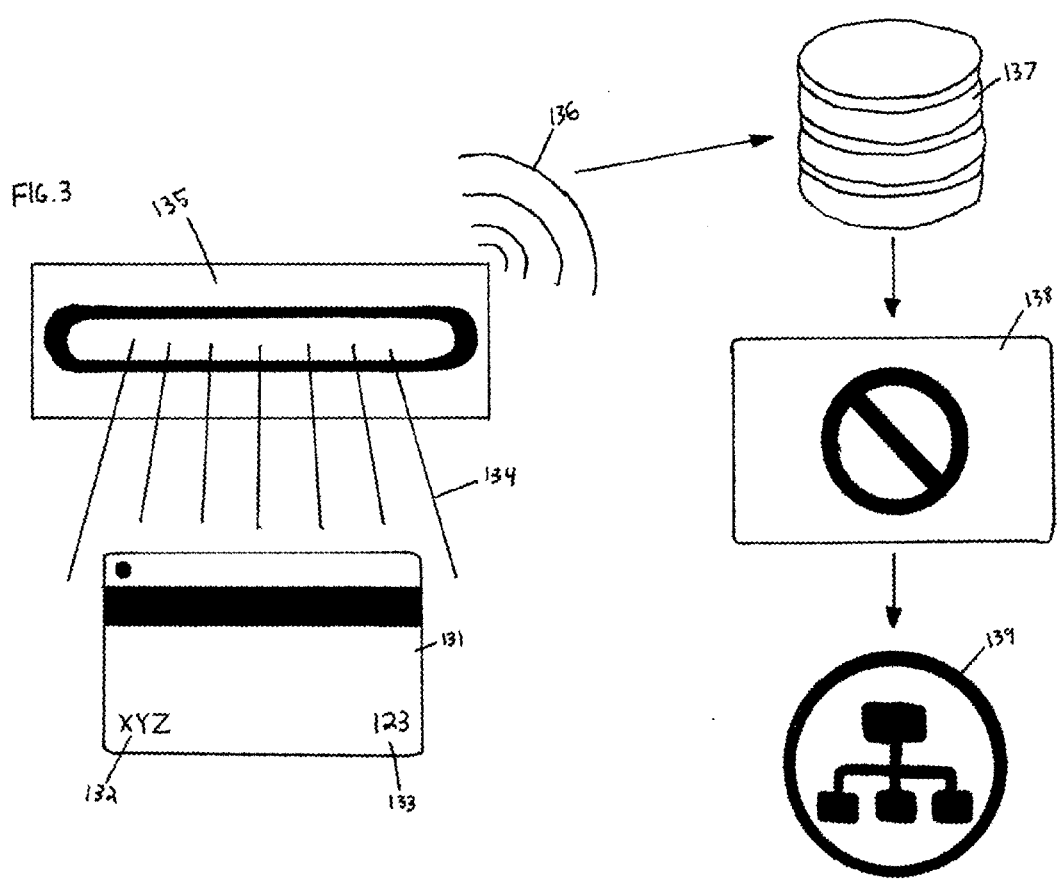

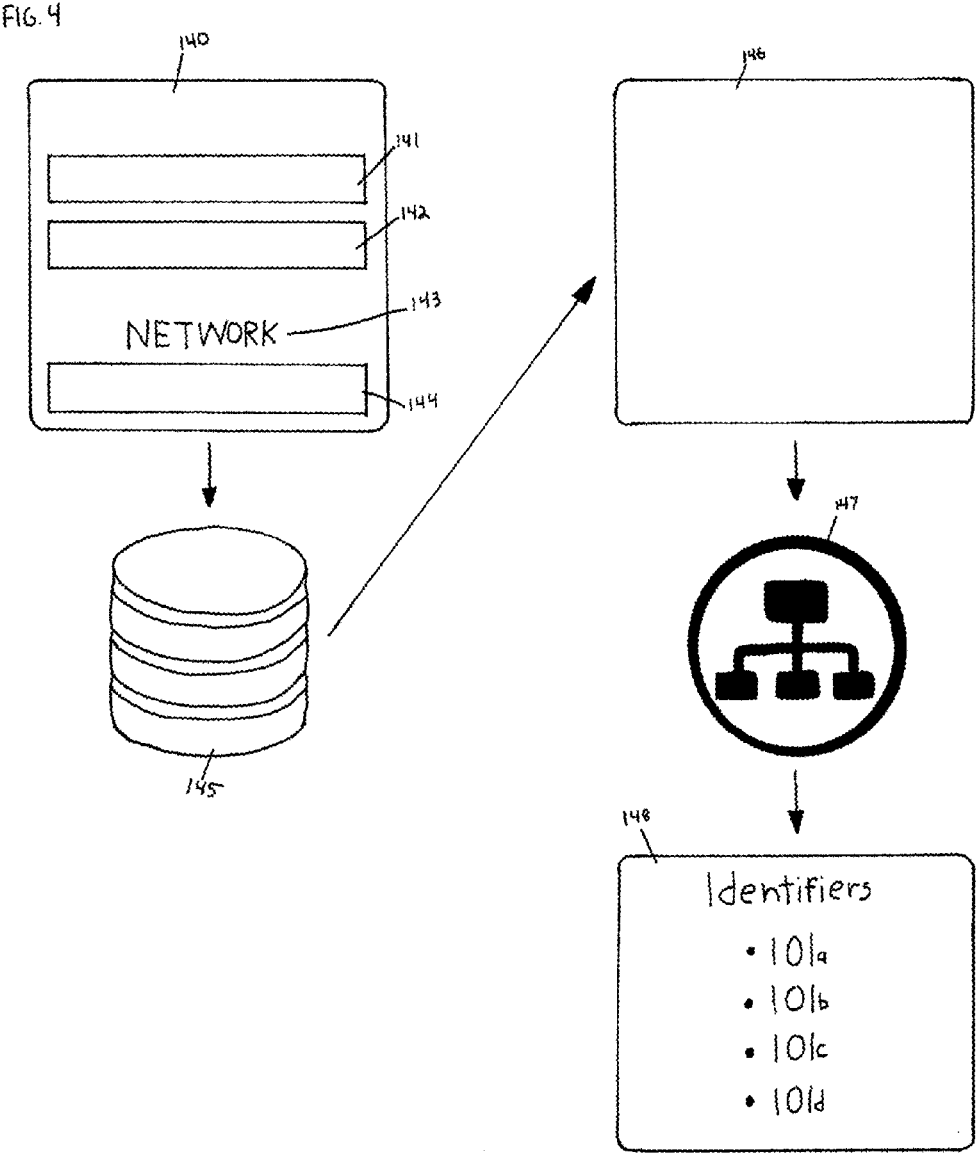

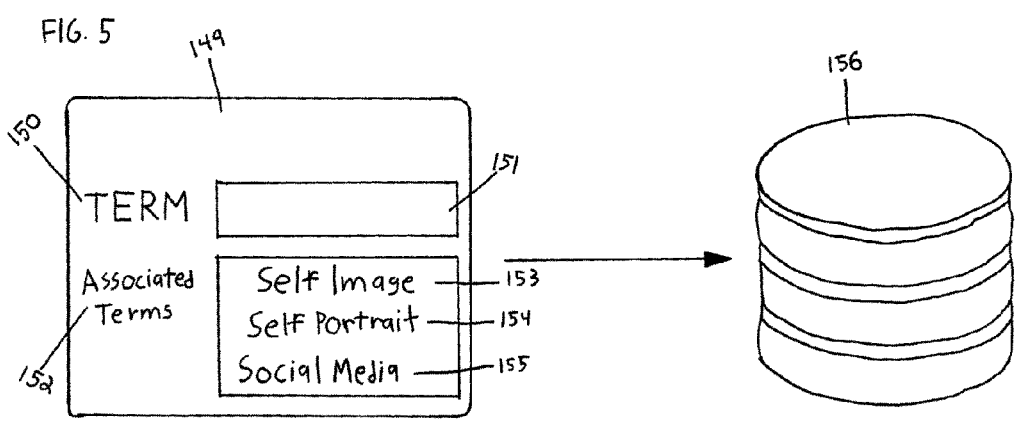

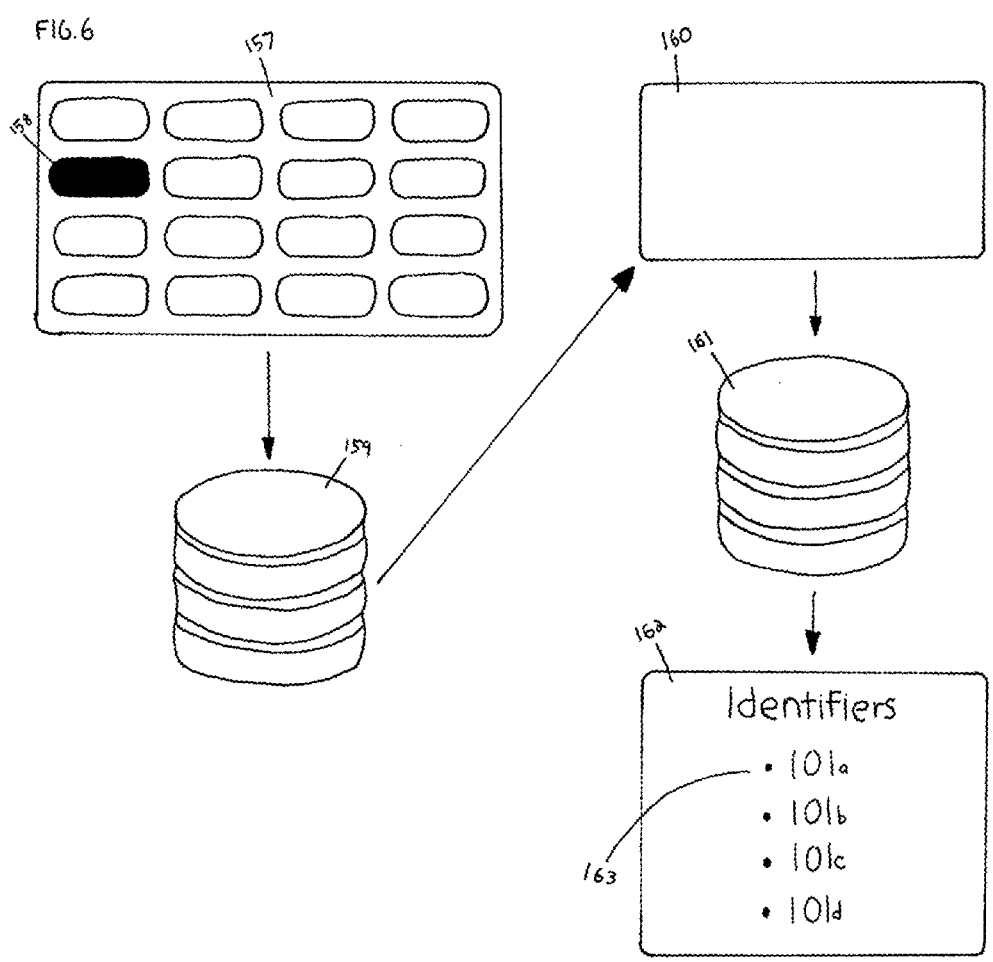

PRIVACY PROTECTED INTERNET NETWORKS, SUBNETWORKS AND SUB-SUBNETWORKS

FIELD OF THE INVENTION

This invention relates generally to computerized methods and systems to create, control and manage restricted scope and closed interactive networks, subnetworks and sub-subnetworks which can be utilized in an array of situations, for example for unique anonymous consumer privacy, personal safety, anti-spam, anti-electronic crime and connectivity to a public or open network. In particular the invention relates to a system and method that provides for restricted scope and closed interactive networks, subnetworks and sub-subnetworks that are anonymously accessed and provides a form of multi-platform digital media that is capable of anonymous user network data collection, unique communication and consumer behavior in relation to said network data collection.

DESCRIPTION OF RELATED ART

The use of networks, as they relate to the internet, are common in businesses, universities and government institutions. The use of networks provide a controlled setting for institutions to communicate and monitor their respective members. It is an important tool for any institution. One drawback to the use of an institution's network is the need for personal identifiable information in order to access the respective network. For example, users of networks, such as Facebook and Linkedin, invariably provide personal identifiable information in order to access the network. Likewise, a student at a university needs student identification in order to access their university's network.

Recent awareness of mass collection of identifiable internet user data has prompted worldwide bodies of legislators, regulators and advocacy groups to request greater privacy and consumer protections, possibly through the creating of a "Digital Bill of Rights" for internet users. User's on a network face intrusive devices such as "Cookies", "Web Beacons" or "Clear gifs" which create privacy concerns for users and legislators.

The design of each network is particular to each institution and far from uniform. One theme among most networks' designs is to collect as much as identifiable user data as possible in the hope of later monetizing of said data. Accordingly, it is desirable to provide system and method that can overcome the above-noted drawbacks. In addition, it is desirable to provide systems, methods and software for creating restricted scope and closed interactive networks, subnetworks and sub-subnetworks that protect the network's users' personal identifiable information and utilize said data anonymously. Furthermore, other desirable features include unique communication. Characteristics of the present invention will become apparent from the subsequent detailed description of the invention and the appended claims, taken in conjunction with the accompanying drawings and this background of the invention.

SUMMARY

Systems and Methods to computerized methods and systems to create, control and manage restricted scope and closed interactive networks, subnetworks and sub-subnetworks which can be used in a variety of ways and as specifically mentioned in Utility application Ser. No. 13/729,359 filed on Dec. 28, 2012, entitled GAME-BASED ADVERTISING SYSTEM AND METHOD.

An open internet network provider and/or a pre-existing internet network provider can choose to connect their network to a restricted scope and closed interactive subnetworks and sub-subnetworks for multiple reasons. Alternatively, the creation of an independent restricted scope and closed internet network can also be created with the similar mechanism as said protected subnetworks and sub-subnetworks. The independent restricted scope and closed internet network can also be the parent to a protected subnetworks and sub-subnetworks.

Access to said protected networks, subnetwork, and sub-subnetworks is highly restricted and controlled. The user and/or possessor can access said protected networks via a device, anonymous access code, anonymous address code and/or a user created anonymous username and password. The access to said devices and/or information is controlled by the protected network provider and/or pre-existing network provider.

Access to said protected networks can occur in a variety of ways. For example, specific physical portals with access readers can be used to verify protected network devices via anonymous address codes and allow entrance into said protected networks. The access readers can deny or allow access based on instructions from the network provider. Alternatively, portals can be web-based in which the possessor and/or user enters an anonymous access code, anonymous address code and/or a user created anonymous username and password.

Upon accessing said protected networks, the possessor and/or user is presented with multiple digital elements that the possessor and/or user can interact with. Digital elements are continuously updated and stored in digital element library database. Interactions are anonymously tracked and stored via the possessor and/or user's anonymous address code. These interactions and/or data exchanges are the basis of network provider's searches, grouping and potential targeting of the possessor and/or user. Under this invention, communication between the possessor and/or user and the network provider is highly protected and unique as explained below.

BRIEF DESCRIPTION OF DRAWINGS

FIG. 3 depicts a reader denying access to a protected network.

FIG. 4 shows one embodiment of the process of searching a protected network for digital elements.

FIG. 5. depicts one embodiment of updating the digital element database with a new digital element search term.

FIG. 6. depicts one embodiment of a user's selection being updated to the user's database.

LIST OF REFERENCE NUMBERS FOR THE MAJOR ELEMENTS IN THE DRAWING

Figure 1:
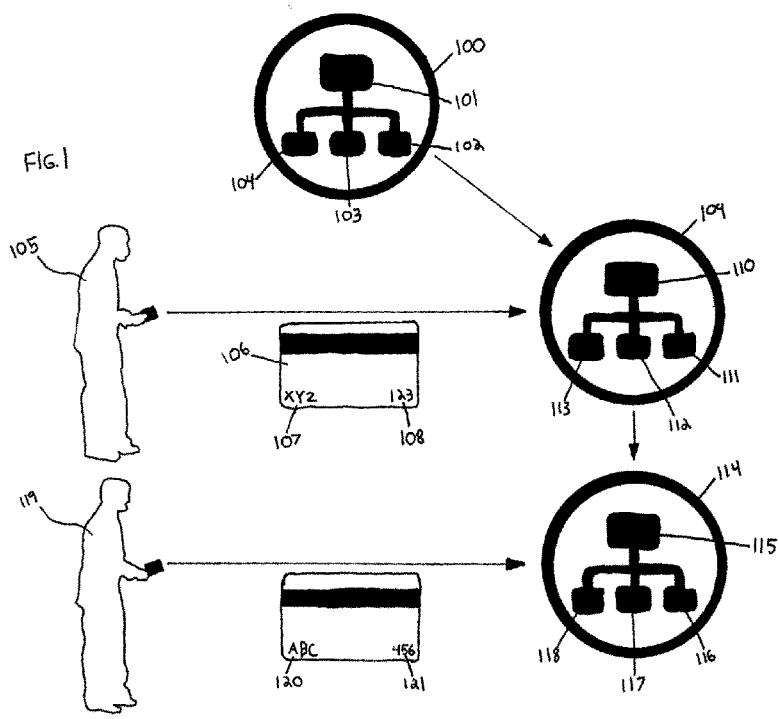
FIG. 1 illustrates an open primary network, a protected subnetwork and sub-subnetwork.

The following is a list of the major elements in the drawings in numerical order.
100 open primary network
101 open primary network's server
102 open primary network's portal
103 open primary network's portal
104 open primary network's portal 105 primary user
106 sub-network device
107 anonymous address code
108 anonymous access code
109 protected subnetwork
110 protected subnetwork's server
111 protected subnetwork's portal
112 protected subnetwork's portal
113 protected subnetwork's portal
114 protected sub-subnetwork
115 protected sub-subnetwork's server
116 protected sub-subnetwork's portal
117 protected sub-subnetwork's portal
118 protected sub-subnetwork's portal
119 secondary user
120 anonymous address code
121 anonymous access code
122 user
123 protected network device
124 anonymous address code
125 anonymous access code
126 protected network
127 protected network's server
128 protected network's portal
129 protected network's portal
130 protected network's portal
131 protected network device
132 anonymous address code
133 anonymous access code
134 reader access signal
135 reader
136 reader communication signal
137 protected network database
138 protected network denial
139 protected network
140 protected network digital element search screen
141 digital element input
142 digital element input
143 protected network to be searched
144 protected network to be searched input
145 digital element library database
146 results of digital element search
147 protected network
148 search results via users' address codes
149 network provider's digital element input screen
150 digital element
151 digital element input
152 digital element association terms
153 digital element association input
154 digital element association input
155 digital element association input
156 digital element library database
157 user protected network screen
158 user selection
159 digital element library database
160 digital element results
161 protected network database
162 users' associated with digital elements
163 anonymous address code

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Additionally, although the invention is described below as being implemented commercially, it will be appreciated that the invention can also be used for communication and may alternatively incorporate in the invention.

The present invention may be described in terms of functional diagrams and various processing steps. It should be appreciated that such functional diagrams may be realized in many different forms of hardware, firmware, and/or software components configured to perform the various functions. For example, the present invention may employ various processors, sensors, memory elements, digital signaling processing elements, and the like, which may carry out a variety of functions under the control of one or more microprocessors or other control devices. Such general techniques are known to those skilled in the art and are not described in detail herein. Furthermore, it should be understood that the exemplary process illustrated may include additional or fewer steps or may be performed in the context of a larger processing scheme. The various methods presented in the drawings, figures, or the specification are not to be construed as limiting the order in which individual steps may be performed. It should be appreciated that the particular implementations shown and described herein are illustrative of the invention and its best mode and are not intended to otherwise limit the scope of the invention in any way.

Provided herein are methods and systems to create, control and manage restricted scope and closed interactive networks, subnetworks and sub-subnetworks.

Turning now to the description, and with reference to FIG. 1, an illustration of an open network, a protected subnetwork and sub-subnetwork. The open primary network 100 can be embodied as any institutions' pre-existing network, which has an open primary network server 101 and multiple network's portals 102, 103, 104, which allows entrance into the open primary network 100. Connected to the open primary network 100 is a protected subnetwork 109 and a protected sub-subnetwork 114. In order to access the protected subnetwork 109, the primary user 105 must obtain an anonymous access code 108. The anonymous access code 108, as illustrated in this embodiment, is contained on a subnetwork device 106, and numerically represented. The subnetwork device 106 also contains an anonymous address code 107, which is associated with the subnetwork device 106, not the primary user 105. After obtaining an anonymous access code 108, the primary user 105 may input the anonymous access code 108 into any of the protected subnetwork's portals 111, 112, 113. Upon acceptance of the anonymous access code 108 at a protected subnetwork's portal 111, 112, 113, the protected subnetwork's server 110 will direct the primary user 105 to a user interfacing compartment within the protected subnetwork 109.

Further illustrated in FIG. 1 is the ability of the primary user 105 to provide an anonymous address code 120 and an anonymous access code 121 to a secondary user 119 in order for the secondary user 119 to access the protected sub-subnetwork 114 via the protected sub-subnetwork's portals 116, 117, 118. As stated above the secondary user 119 will be directed by the protected sub-subnetwork's server 115 to a user interfacing compartment within the protected sub-subnetwork 114. In this illustration, the protected sub-subnetwork 114 is connected to the protected subnetwork 109, which is connected to the primary network 100. Moreover, the primary user 105 has the capability to provide multiple anonymous address codes and anonymous access codes to multiple secondary users.

Not illustrated but claimed is the ability of the protected subnetwork's portals 111, 112, 113 or protected sub-subnetwork's portals 116, 117, 118 to be geographically placed physical portals in which the protected subnetwork's server 110 can be accessed at said physical portals. The physical portals may utilize a reading device used to verify the authenticity of a protected network device and allow access to the protected network. Likewise, it is possible that the protected subnetwork's portals 111, 112, 113 can be accessed at any location, web-based, via a user's mobile phone, tablet, computer or the like. Further, not illustrated but claimed is the anonymous access codes or anonymous address codes being represented alphanumerically, in any string of characters, a symbol, hologram or the like that is capable of being accepted at network's portals.

Figure 2:
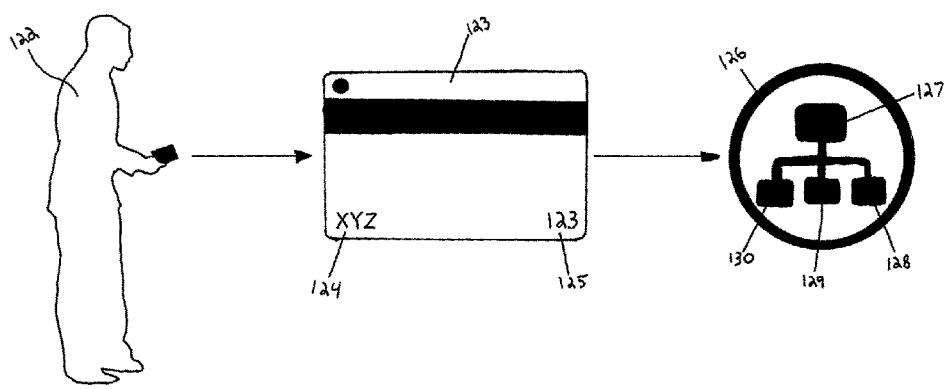
FIG. 2 depicts access to a protected network.

With reference to FIG. 2, the user 122 obtains a protected network device 123 that has an anonymous address code 124, which is linked to the protected network device 123, and anonymous access code 125 which is input by the user 122 into any of the protected network's portals 128, 129, 130. Upon acceptance of the anonymous access code 125 the protected network's server 127 directs the user 122 to a user interfacing compartment within the protected network 126. Illustrated in FIG. 2, is a protected network 126 that is not connected to another network. Further, not illustrated but claimed is the ability of the protected network 126 to be connected to protected subnetworks, protected sub-subnetworks and/or open networks. Moreover, not depicted but claimed is the use of the anonymous access code 125 as a one-time use code for the user to access a unique interactive compartment in which the user is prompted to create an anonymous username and password to enter the protected network thereafter.

Illustrated in FIG. 3, is one embodiment of the denial of entrance into a protected network. In this illustration, the protected network device 131 is equipped with an anonymous address code 132 and an anonymous access code 133. The protected network device 131 is being read or scanned by the reader 135 via the reader access signal 134, thereafter the reader communication signal 136 communicates with the protected network access database 137 in order to authenticate whether the protected network device 131 is authorized to access the protected network 139. In this illustration, the protected network device 131 is denied access 138 to the protected network 139. Not illustrated but claimed is the ability of the protected network provider to enter the protected network database 138 or stand alone reader 135 in order to: allow or not allow; receive or not receive; and/or transmit or not transmit the data and/or information to the protected network 139.

Depicted in FIG. 4, is one embodiment of searching a protected network for users interactions with digital elements on the protected network. Users of a protected network, protected subnetwork or protected sub-subnetwork will be presented with digital elements that the users may or may not interact with. A digital elements on a protected network, protected subnetwork or protected sub-subnetwork is a term of art of the computerized systems and methods that refers to any digital code, regardless of length, that conveys meaning in the traditional defined sense of the word "semantic" which is defined as relating to meaning in language or logic.

Illustrated in FIG. 4 is one embodiment of searching the protected network in which the protected network provider enters the protected network digital element search screen 140 and inputs the digital element to be searched in the digital element input 141, 142. In this illustration two digital elements are being searched. The network provider has the option to choose what protected network to be searched 143 and can the input protected network to be searched 144. Thereafter, the digital element library database 145 is searched for terms that correlate to the digital elements input 141, 142, which provides results of correlated terms of the digital element search 146. The results of the digital element search 146 are then searched within the protected network(s) 147 which provides a list of address codes 148 who interacted with the digital elements input 141, 142.

Not illustrated but claimed is the network provider's ability to not input a protected network to be searched 144, in which the system will search all protected networks, protected subnetworks and protected sub-subnetworks for a single or multiple digital element.

Illustrated in FIG. 5, is the process of updating the digital element library database 156 with a new digital element 150, in which the protected network provider enters the network provider's digital element input screen 149 and inputs the digital element 150 in the digital element input 151 and the digital element association terms 152 in the digital element association input 153, 154, 155. The digital element 150 and digital element association terms 152 are stored in the digital element library database 156. The digital element 150 and the digital element association terms 152 can be among other things a word, term, image, 3-D image, hologram and/or anything capable of being input.

Referring to FIG. 6, the user has entered the user protected network screen 157 within the protected network and is presented with multiple digital elements. The user selects 158 a digital element for a comedy club and continues to interface with the user protected network screen 157. Simultaneously, the user's selection 158 of a digital element, for example a comedy club, is searched within the digital element library database 159 to find other digital elements associated with the user's selection 158, which results in associated digital element results 160. Thereafter, said digital element results 160 are stored in the networks' database 161 and if search is conducted of the protected network for the digital element 158 and/or associated digital element results a list of users associated with said digital elements 162 are presented with each anonymous address code 163.

Not illustrated but claimed is a method wherein in at least one search term or digital element, which is unique to the system, is inserted into each anonymous address code and/or communication code at the discretion of the network provider. Said method introduces an ad hoc method of making the anonymous address code and/or communication code for any communication within the system unique at a level of granularity wherein some and/or all of said communications can be unique.

Not illustrated but claimed are search results that identify the first time the user interacted with the digital element(s) that was searched. The search results can also be displayed in a continuously updating graphical route map of the digital element(s) searched which represents the initial graphical location from all primary users to all associated secondary users that interacted with the searched digital element(s). The search results can also be depicted to show the most popular digital element among users of the protected network.

Not illustrated but claimed are the systems and methods to group users of a protected network, subnetwork or sub-subnetwork in relation to the digital elements that they interact with while on the protected network. Users and/or digital address codes can be grouped in "tertiary groups" for advertising, messaging, marketing, polling, personal safety and cyber security among others. A "tertiary group" are users and/or digital address codes who interact with the same or similar digital elements at a specific network portal, physical or otherwise, and are marketed to through a specific advertising campaign with the results of the advertising campaign recorded. Users and/or digital address codes of the protected network, subnetwork or sub-subnetwork can also be ranked and placed in a hierarchical database based on the monetary value of the digital elements the users and/or digital address codes interact with. Based on the hierarchical database of users and/or digital address codes, the protected network provider can create "scalable value proposition lists" in which advertisers can target a limited number of users and/or digital address codes within the hierarchical database in order to determine the success rate of an advertising campaign and proceed to scale up successful advertising campaigns and discontinue unsuccessful advertising campaigns. Not illustrated but claimed is the applications of the systems and methods herein to private digital networks that are not internet networks.

The invention claimed is:

1. A non-transitory computer-readable medium storing software instructions that are executable to perform operations comprising:
a creation of a protected subnetwork that can be accessed anonymously by a user via a subnetwork protected device having an anonymous code associated to the subnetwork protected device, wherein said protected subnetwork is connected to a pre-existing network, the software enables the subnetwork protected device to be verified by a protected network reader; upon verification of authenticity the software allows the user access to the subnetwork and digital elements, anonymously storing and tracking all user interactions with the digital elements by the anonymous code within the protected subnetwork, wherein said digital elements is any digital code that conveys meaning and is defined as relating to meaning in language and logic, thereafter providing the user of the subnetwork protected device with multiple anonymous codes, the multiple anonymous codes being distributed to other new users in order to access a protected sub-subnetwork via multiple protected sub-subnetwork devices and interactions with digital elements.

2. The medium as recited in claim 1, wherein said software instructions enable the creation of the protected sub-subnetwork that is connected to the subnetwork that can be accessed by a sub-subnetwork protected device.

3. The medium as recited in claim 1, wherein said software instructions allow a network provider to search the protected subnetwork and the protected sub-subnetwork for all subnetwork and sub-subnetwork protected device interactions with a digital element and generate a list of anonymous address codes of said interactions.

4. The medium as recited in claim 1, wherein said software instructions allow access to the protected subnetwork through an anonymous access code.

5. The medium as recited in claim 1, wherein said software instructions allow access to the protected subnetwork through an anonymous address code.

6. The medium as recited in claim 1, wherein said software instructions allow access to the protected subnetwork through the anonymous code, the anonymous code being a user created anonymous user name and password.

7. The medium as recited in claim 1, wherein said software instructions allow a network provider to enter a protected network database or the reader and deny access to the subnetwork.

8. The medium as recited in claim 1, wherein said digital element interactions by the user are stored in a digital element library database for interaction search purposes.

9. The medium as recited in claim 1, wherein said protected sub-network is not connected to the pre-existing network.

10. The medium as recited in claim 1, wherein at least one digital element that is unique to the network is inserted into a communication code for communication between a network provider and a possessor of a subnetwork protected device.

11. A system, comprising:
a server computer storing software instructions enabling a connectivity between a pre-existing internet network, a protected subnetwork and a protected sub-subnetwork, the software instructions allowing a possessor of a subnetwork protected device to anonymously enter the protected subnetwork via an anonymous code, upon verification of authenticity the software allows the possessor to interact with digital elements, anonymously storing and tracking all possessor interactions with the digital elements by the anonymous code; thereafter providing the possessor of the subnetwork protected device with multiple anonymous codes, the multiple anonymous codes being distributed to other new possessors in order to access the protected sub-subnetwork via multiple protected sub-subnetwork devices and interact with digital elements.

12. The system of claim 11, wherein the protected subnetwork and the protected sub-subnetwork are accessible via an anonymous access code.

13. The system of claim 11, wherein the protected subnetwork and the protected sub-subnetwork are accessible via an anonymous address code.

14. The system of claim 11, wherein the protected subnetwork and the protected sub-subnetwork are accessible via the anonymous code, wherein the anonymous code is a one-time use code and the possessor is prompted to create an anonymous username and password.

15. The system of claim 11, wherein communication between a protected network provider and the possessor of the subnetwork protected device is accomplished by inserting at least one digital element that is unique to the system into a communication code.

16. The system of claim 11, wherein all possessor interactions with the digital elements on the protected subnetwork and protected sub-subnetwork are stored in a database.

17. The system of claim 11, wherein the digital elements on the protected subnetwork and protected sub-subnetwork are input by a network provider and stored in a digital element library database.

18. The medium as recited in claim 1, wherein the digital interactions are continuously updated and stored in the digital element library database.

* * * * *